(12) United States Patent
Malkamaki et al.

(10) Patent No.: US 6,385,190 B1
(45) Date of Patent: May 7, 2002

(54) MOBILE COMMUNICATIONS SYSTEM WHICH USES TDMA FOR SPEECH DATA AND OFDM FOR CONTROL/EXTENDED DATA

(75) Inventors: Esa Malkamaki, Espoo; Lauri Oksanen, Helsinki, both of (FI)

(73) Assignee: Nokia Mobile Phones Limited, Espoo (FI)

( * ) Notice: Subject to any disclaimer, the term of this patent is extended or adjusted under 35 U.S.C. 154(b) by 0 days.

(21) Appl. No.: 09/214,890
(22) PCT Filed: Jul. 4, 1997
(86) PCT No.: PCT/IB97/00837
    § 371 Date: Feb. 18, 1999
    § 102(e) Date: Feb. 18, 1999
(87) PCT Pub. No.: WO98/02982
    PCT Pub. Date: Jan. 22, 1998

(30) Foreign Application Priority Data

Jul. 17, 1996 (GB) ............................................... 9615030

(51) Int. Cl.$^7$ ............................................. H04B 7/212
(52) U.S. Cl. ....................................... 370/347; 370/204
(58) Field of Search ................................. 370/310, 315, 370/328, 329, 330, 336, 337, 344–350, 203, 204

(56) References Cited

U.S. PATENT DOCUMENTS 5,134,615 A * 7/1992 Freeburg et al. ............ 370/347
5,428,613 A * 6/1995 Spiotta et al. ............... 370/458
5,446,739 A * 8/1995 Nakano et al. ............. 370/337

* cited by examiner

Primary Examiner—David R. Vincent
(74) Attorney, Agent, or Firm—Perman & Green, LLP (57) ABSTRACT

Mobile communications apparatus (103) are arranged to transmit encoded speech in accordance with a first protocol and to transmit extended data in accordance with a second protocol. A wideband extension (601) is divided into time slots (TN0–TN7) which are substantially in phase with time slots for speech transmission. Signalling channels provided for speech are also used for establishing data calls within the extension. Extended data is conveyed by a process of orthogonal frequency division multiplexing is created (804). The multiplex is created by an inverse fast Fourier transform (903) and the transmission frequencies undergo a hopping sequence.

37 Claims, 8 Drawing Sheets

MOBILE COMMUNICATIONS SYSTEM WHICH USES TDMA FOR SPEECH DATA AND OFDM FOR CONTROL/EXTENDED DATA

FIELD OF THE INVENTION

The present invention relates to mobile communications arranged to transmit encoded data in accordance with a first protocol and to transmit extended data in accordance with a second protocol.

BACKGROUND OF THE INVENTION

Radio transmission systems using frequency division multiplex and time division multiple access are known; an example being the GSM system for mobile telephony. A primary band between 890 megahertz and 960 megahertz is allocated for GSM transmissions with each of these 25 megahertz bands being divided into a plurality of carriers, with a 200 kilohertz displacement between said carriers. This provides for a total of 122 usable carriers within the allocated bandwidth, each divided into a total of eight transmission channels in the time domain, identified as time slot number 0 to time slot number 7. The eight time slot cycle occupies a time division multiple access (TDMA) frame of 4.615 milliseconds.

The size of finite time slots within a finite frequency band will determine the maximum theoretical data rate for a digitally transmitted signal. Standard GSM allows a sufficient data rate for encoded speech signals to be transmitted and much work has been done in terms of minimizing data rates while minimizing signal degradation.

Increasingly, cellular radio communication is being used for the transmission of data as an alternative to encoded speech, possibly as a direct modem link, a link to the Internet or as a facsimile transmission. GSM recommendations include provisions for data transmission in which, for example, the interleaving depth is increased so as to reduce the effect of errors due to fading. However, it is appreciated that a demand exists for higher rates of mobile data transmission which would require a higher bandwidth than that provided by a conventional GSM channel, or a similar channel provided within a mobile telecommunications network essentially designed for the transmission of encoded speech.

The problem of fading associated with radio transmission is well documented. In addition to causing amplitude variations, fading caused by multi-path reflections also results in frequency selective fading in which, although some frequencies are attenuated, other frequencies are enhanced due to the accumulation of in-phase reflections. The effect of these amplitude variations, in terms of signal degradation and distortion (resulting in data loss in the digital domain) are accommodated in GSM by providing interlacing and error correction. However, the problem becomes worse as signal bandwidth is increased. Under these circumstances, some parts of the signal itself, in the frequency domain, may suffer from constructive interference whereas other parts of the signal may suffer from destructive interference, possibly to the point of total extinction.

Generally, frequency components close together will suffer similar variations and may therefore be considered as being well correlated. However, others which are further apart will be less well correlated and the correlation bandwidth may be considered as the frequency separation of signals that are correlated by a particular factor, usually taken as 0.9 or better. For a narrowband signal, frequency selective distortion is usually minimized if the bandwidth is less than the correlation bandwidth of the channel. Similarly, a signal which occupies a wider bandwidth (greater than the correlation bandwidth) will be subject to more distortion. Thus, providing a greater bandwidth for a particular transmission channel will not result in a pro rata increase in the data transfer capacity. As the bandwidth increases, the introduction of errors, due to multi-path transmission, will also increase. Thus, a straightforward approach of increasing channel bandwidth to provide broadband services results in less efficient use of the available total bandwidth being made, which in turn would place severe commercial limitations upon the exploitation of broadband services of this type.

As previously stated, the total theoretical data rate is determined by the bandwidth allocation in the frequency domain and time slot duration in the time domain. Thus, if it is not possible to increase data rate by increasing bandwidth, it should be possible to increase data rate by allocating more time slots to a particular channel or to allowing each channel to be provided with the full duration of each carrier, that is to say, by removing the time division multiple access component.

The TDMA aspect of digital cellular mobile transmission is also important in terms of channel identification, power saving and signalling. Thus, if wideband access is to be given to mobile users, it is preferable for this access to be made compatible with existing schemes. Thus, in order to maintain this compatibility, it is preferable to maintain the time division multiple access component in frames similar to that used in encoded speech transmission such that, with this constraint in mind, it is then necessary to increase available frequency bandwidth within each of the allocated time slots.

A system configured to dynamically select frequencies in time slot assignments for communication with devices having different communication protocols is disclosed in United States patent publication 5,134,615. A frequency agile transmitter and receiver are combined with an adaptable time slot selector thereby enabling communications with the remote devices utilising different protocols.

The relationship between time slots and frequency channels is illustrated in FIG. 2 of the aforesaid disclosure. Three different types of TDMA devices are shown as being accommodated within each frame. In each of time slot T1 and T4, one type of device is accommodated by two time slots per frame by utilising three continuous channels CH1 to CH3. The data transmitted during these time slots is accommodated by a carrier frequency at the centre of channel CH2 with a bandwidth of three channels. In time slot T2 a second different device with less data throughput is accommodated with only one channel frequency. In time slot T3 a third different device is accommodated by utilising the bandwidth of frequency channels CH3 and CH4.

SUMMARY OF THE INVENTION

According to a first aspect of the present invention, there is provided communications apparatus for mobile telephones, arranged to transmit first encoded data in accordance with a first protocol and to transmit extended data in accordance with a second protocol, comprising first transmission means configured to transmit encoded speech data over time slots within time division multiple access frames; and second transmitting means for transmitting said extended data, wherein a second bandwidth for transmission of said extended data is divided into time slots substantially similar to said time slots for said first data which are substantially in phase with time slots for said speech data while occurring at a higher data rate than the data rate for the transmission of said speech data.

In a preferred embodiment, the first transmission means is arranged to transmit said encoded speech data in accordance with GSM recommendations.

According to a second aspect of the present invention, there is provided communications apparatus for mobile telephones, arranged to transmit a first encoded data in accordance with a first protocol and to transmit extended data in accordance with a second protocol, comprising a first transmission means for transmitting said first data over time slots within time division multiple access frames encoded in accordance with GSM recommendations; and second transmitting means for transmitting said extended data, wherein a second bandwidth for transmission of said extended data is divided into time slots substantially similar to said time slots for said first data, wherein said first transmission means and second transmitting means transmit data within frames having eight time slots.

In a preferred embodiment, the second transmitting means is arranged to transmit extended data at a second data rate higher than the data rate for the transmission of said first data.

According to a third aspect of the present invention, there is provided communications apparatus for mobile telephones, arranged to transmit first encoded data in accordance with a first protocol and to transmit extended data in accordance with a second protocol, comprising a first transmission means for transmitting said first data over time slots within time divisional multiple access frames; and second transmitting means for transmitting said extended data, wherein a second bandwidth for transmission of said extended data is divided into time slots substantially similar to said time slots for said first data, wherein said first transmission means include signalling means arranged to communicate via signalling channels and said signalling means arranged to establish data calls for said second transmitting means.

DETAILED DESCRIPTION OF THE PREFERRED EMBODIMENTS

Figure 1:
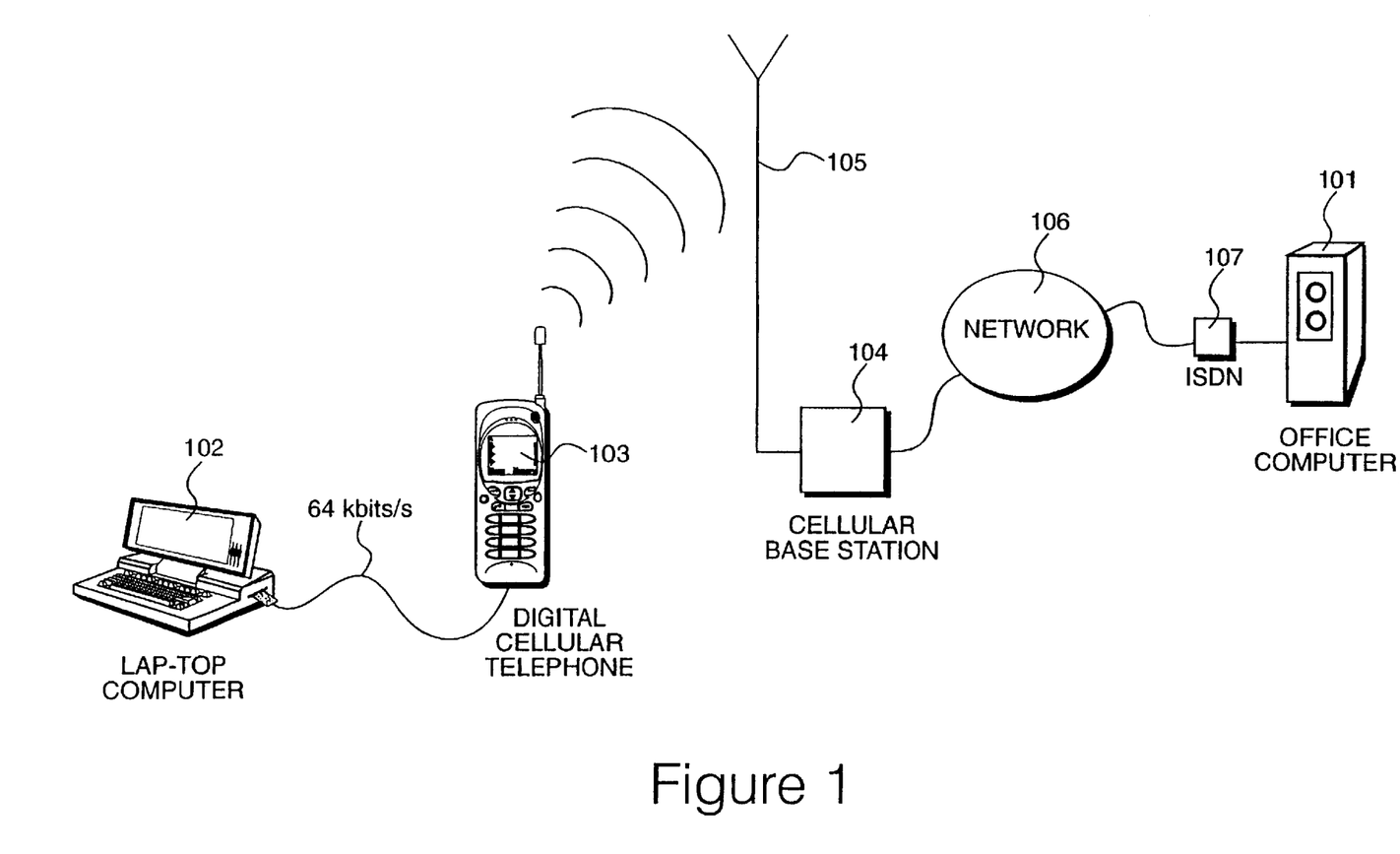
FIG. 1 shows a cellular mobile environment facilitating data communication.

The invention will now be described by way of example only with reference to the previously identified drawings. A digital data transmission environment is illustrated in FIG. 1, in which a remote user may communicate with a central office computer 101 by means of a lap top computer 102 and a digital cellular telephone 103. The digital cellular telephone 103 is capable of operating in a first mode, wherein a speech channel is established in accordance with the GSM recommendations, such that 200 kilohertz frequency channels are divided into 8 time slots within a 4.615 millisecond frame. In addition, the digital cellular telephone is arranged to operate in a second mode, wherein the interleaving depth is increased for the transmission of machine readable data. Furthermore, the digital cellular telephone is arranged to operate in a third mode at an alternative frequency, where a greater bandwidth is provided to facilitate digital data transmission at 64 kilobits per second with low error rates. The ability to transmit data in this third mode has been identified as a wideband extension to the normal speech transmission characteristics.

During normal speech transmission or during wideband data transmission, the cellular telephone 103 is arranged to communicate with a cellular base station 104 via a base station antenna 105. Cellular base station 104 is interfaced to a terrestrial network 106 which in turn allows signals to be transmitted to the office computer 101 via a suitable ISDN interface 107.

Figure 2:
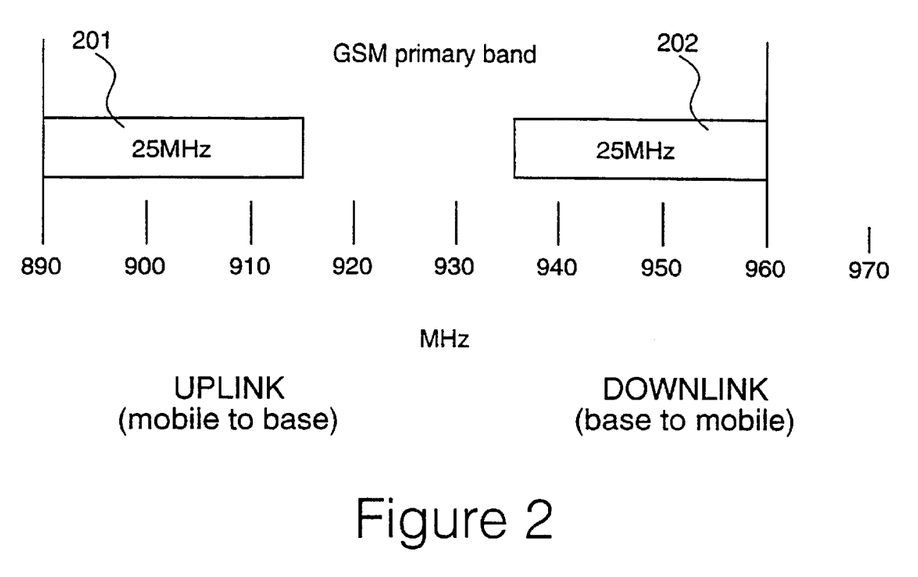
FIG. 2 identifies the GSM primary band.

GSM specifications identify a primary band for transmission between 890 megahertz and 960 megahertz, as shown in FIG. 2. Bandwidth region 201 represents a 25 megahertz region from 890 megahertz to 915 megahertz available for uplink transmissions from mobile telephones to base stations. Similarly, bandwidth 202 represents a 25 megahertz region from 935 megahertz to 960 megahertz available for downlink transmissions from base stations to mobile stations. The spectral region from 915 megahertz to 935 megahertz is not used, thereby providing a sufficient displacement between the uplink transmissions and the downlink transmissions so that said transmissions may be distinguished using analog filtering techniques.

Figure 3:
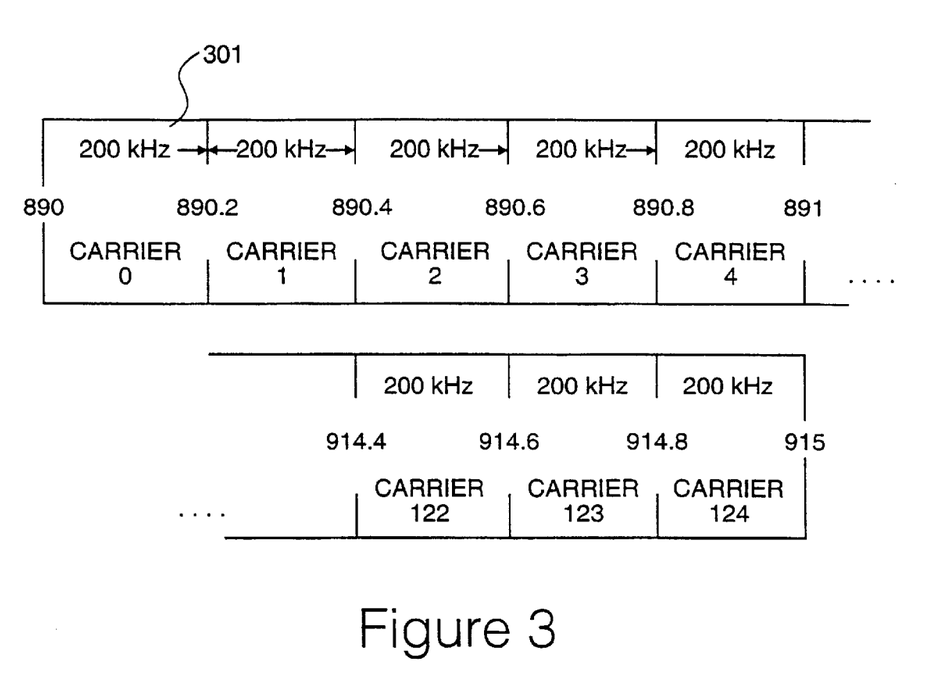
FIG. 3 shows frequency division of the primary band shown in FIG. 2.

Each 25 megahertz band 301, 302 is further divided in the frequency domain so as to allow a plurality of transmissions to occur, separated by frequency division multiplex. As shown in FIG. 3, spectrum 301 is divided from 890 megahertz to 915 megahertz into individual bands of 200 kilohertz. Within each band, a carrier signal is modulated for the transmission of digital data. Thus, within each frequency subdivision of spectrum 301 carrier signals are transmitted, identified as carrier 0, carrier 1, carrier 2, carrier 3, carrier 4 etc upto carrier 122, carrier 123, carrier 124. Each carrier may be modulated within its allocated band, thereby placing the major part of the signal energy within frequency allocations of 890 megahertz to 890.2 megahertz for carrier 0, 890.2 megahertz to 890.4 megahertz for carrier 1 etc. Each carrier signal, usually ranging from carrier 1 to carrier 122, may be modulated in response to digital signals which are in turn derived from a time division multiplex. The multiplex is derived from a total of 8 communication sources and a specific communications channel is defined in terms of its carrier frequency and its time slot number (TN0 to TN7) within the time division multiplex. Conventional GSM transmissions therefore make use of frequency division multiplex, and time division multiple access within each of said frequency carriers.

Figure 4:
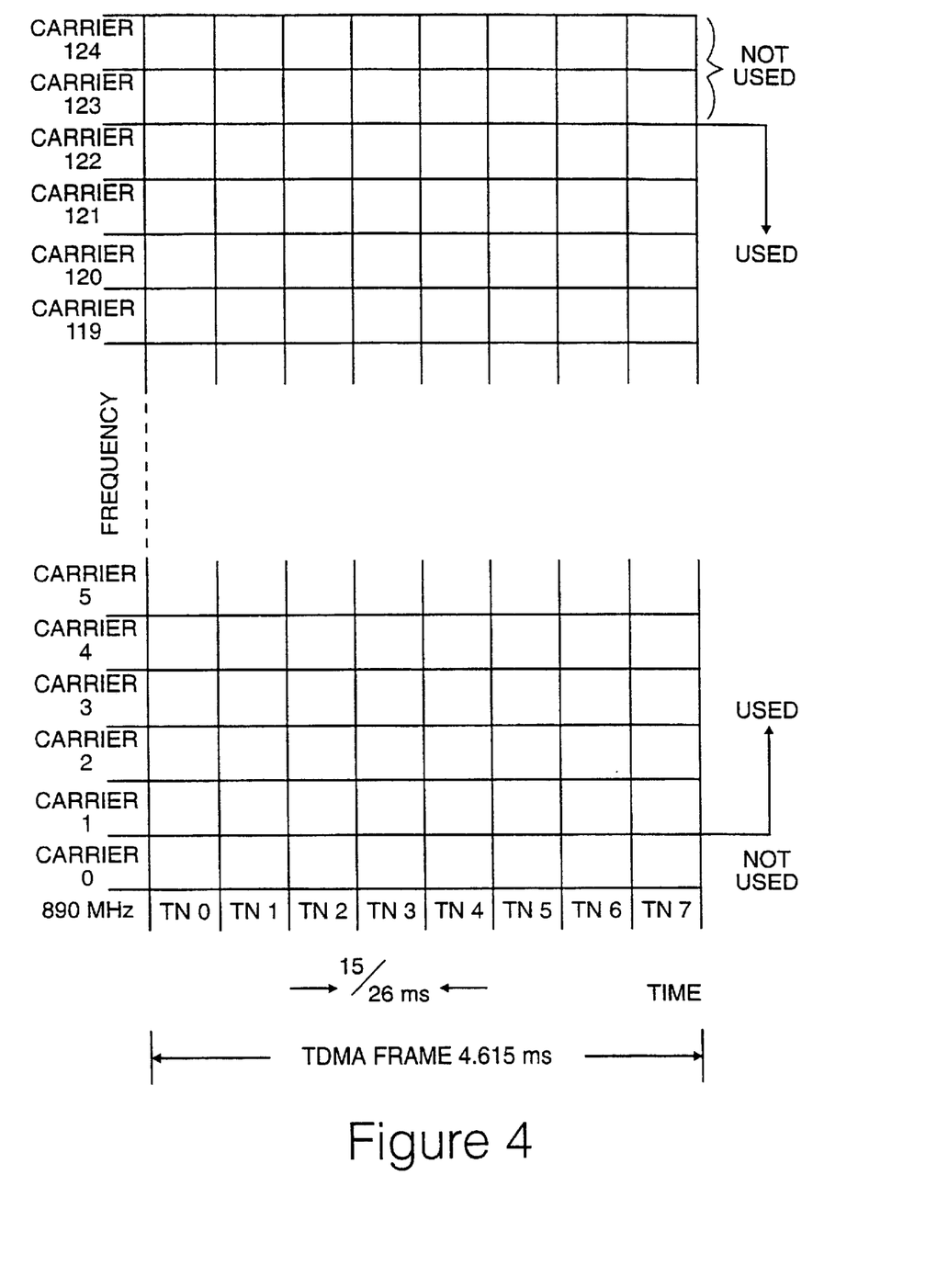
FIG. 4 shows the time division of carriers shown in FIG. 3.

The arrangement of time slots within frequency carrier bands are shown in FIG. 4. Each carrier occupies a frequency band of 200 kilohertz and are shown positioned one above the other vertically. Each frequency band of 200 kilohertz is then subdivided into time slot numbers comprising TN0, TN1, TN2, TN3, TN4, TN5, TN6 and TN7 displayed horizontally in FIG. 4. An eight time slot cycle represents a TDMA frame of 4.615 milliseconds. Within each carrier frequency the time slots are synchronized, that is to say, the time slot boundaries are coincident, as required in order to allow frequency hopping to be achieved. A specific channel is defined in terms of its time slot number within a particular carrier frequency, thereby giving a total of 8×122 possible communication channels. When frequency hopping occurs, transmission is retained within a particular time slot number but with the transmission frequency following a cycle of 64 possible carrier frequencies selected on a frame-by-frame basis. Thus, a particular frequency is maintained for the duration of a frame, whereafter the next frequency in the frequency hopping cycle is selected for the next frame transmission.

Figure 5:
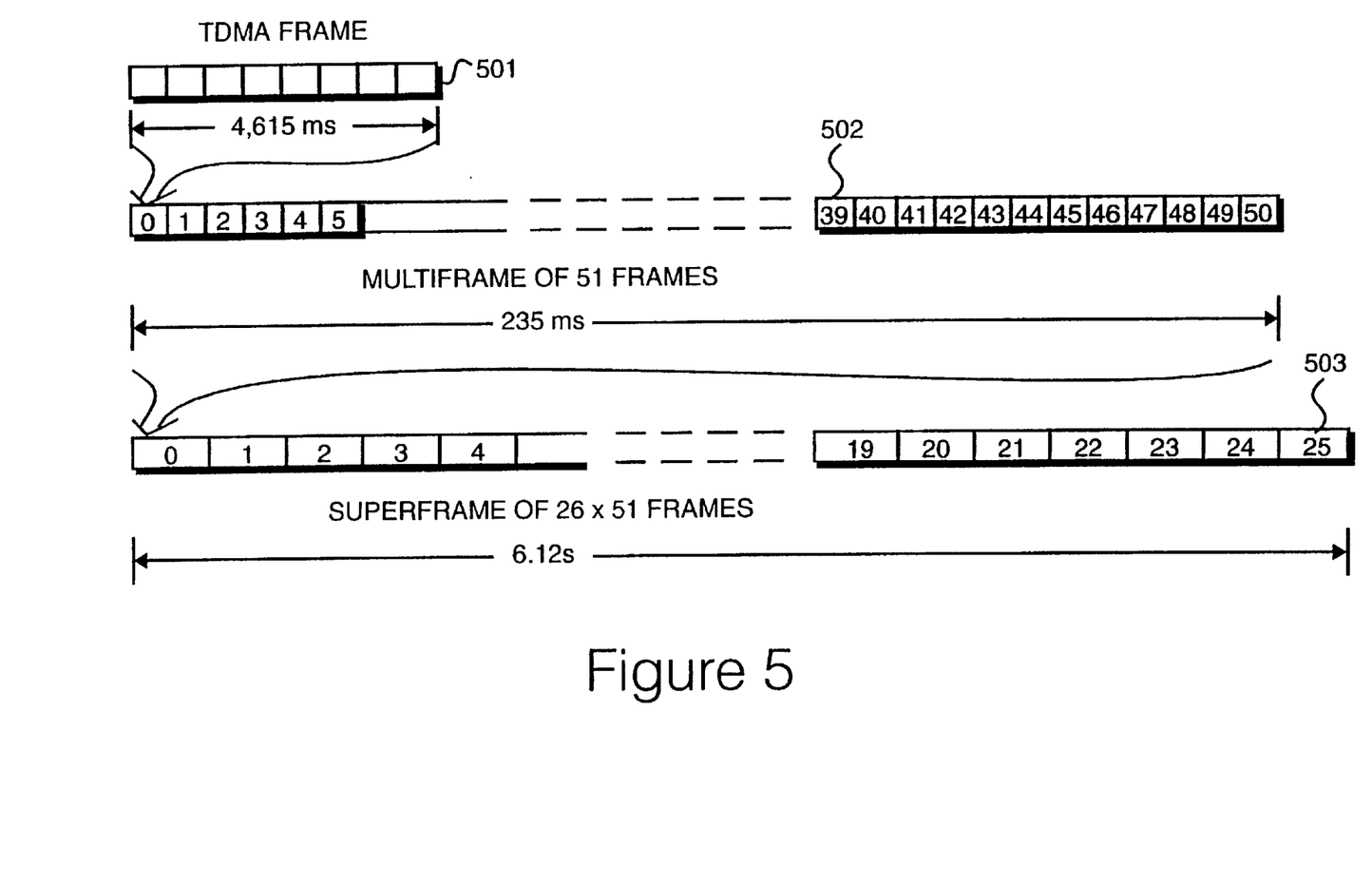
FIG. 5 shows the assembly of time division frames into multi-frames and super frames.

The TDMA frame 501 of 4.615 milliseconds is illustrated in FIG. 5. These frames are grouped into units of 51 frames to produce a multi-frame of 51 frames as shown at 502, having a duration of 235 milliseconds. These multi-frames are further grouped into super frames as shown at 503 consisting of 26 multi-frames resulting in a super frame duration of 6.12 seconds. Control information is broadcast from each base station thereby allowing mobile stations to select a preferred base station for communication purposes. Control information of this type is transmitted on a specific channel for each base station in the network, with duplication only occurring when interference is not possible. Time slot number 0 is selected for control information on a specific channel for each base station, referred to as the beacon frequency. The information contained within this control channel provides for channel allocation allowing calls to be established within the standard speech encoded channels of conventional GSM. In addition, this information is also used to establish wideband connections using alternative but related modulation techniques.

Figure 6:
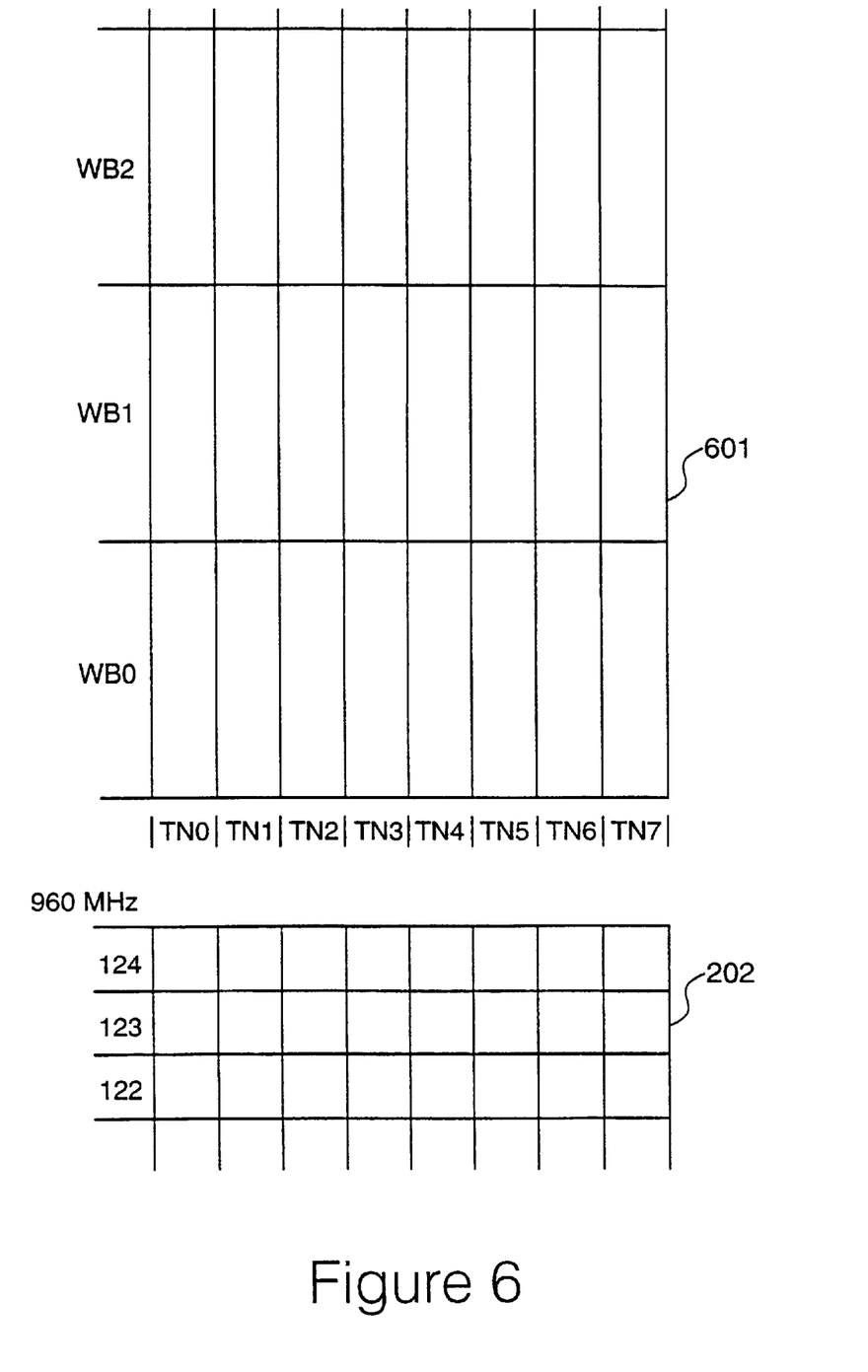
FIG. 6 illustrates the addition of wideband extension for data transmission, synchronized with speech transmission frames of the type shown in FIG. 4.

The top end of a GSM primary band downlink spectrum 202 is illustrated in FIG. 6. As previously stated, each carrier channel, such as channel 122, occupies a total bandwidth of 200 kilohertz allowing encoded speech to be transmitted with a tolerable degree of signal degradation. In accordance with the signalling protocols, a particular transmission channel is identified as belonging to a particular carrier and having a particular time slot number within said carrier.

In addition to the transmission of encoded speech, it is also possible for low bandwidth data to be transmitted within one of the 200 kilohertz time slots. Furthermore, the system is provided with a third mode of operation in which wideband data transmission takes place in a further area of the spectrum, identified as a wideband extension. The bottom of a typical wideband extension 601 is illustrated in FIG. 6.

The time slots of the wideband extension TN0 to TN7 are synchronized to similar time slots of the conventional band 202. Thus, it is possible for signalling information, carried in the broadcast control channel (BCCH) to be used to establish communications using the wideband extension. In this way, it is not necessary to provide an additional signalling system for the wideband transmissions.

The wideband extension 601 is divided into a plurality of wideband carriers WB0, WB1, WB2 etc. The number of carriers contained within a particular extension and the bandwidth allocated to each extension will depend on the data rates required. In this example, each wideband carrier is allocated a bandwidth of one megahertz and the system is arranged to provide a high quality digital link, compatible with ISDN transmissions, of 64 kilobits per second. Thus, each time slot within each wideband carrier provides sufficient bandwidth for a single-duplex 64 kilobits per second data stream to be transmitted as an uplink communication or a downlink communication. Thus, to establish full duplex communication of 64 kilobits per second, an uplink time slot is selected from a first wideband extension spectrum, with a second similar spectrum being provided for similar downlink communications.

Figure 7:
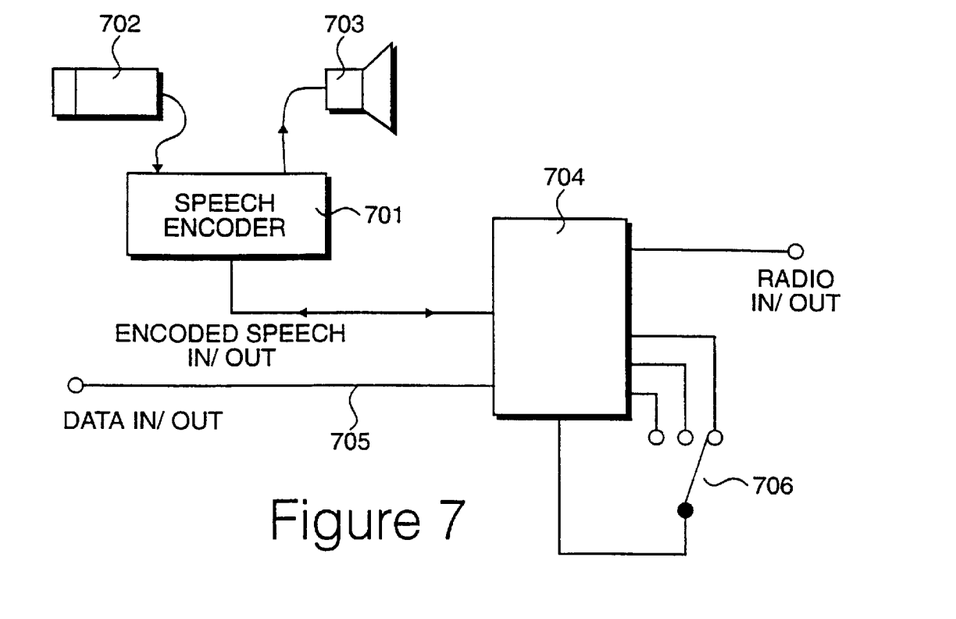
FIG. 7 is a schematic representation of the digital cellular telephone shown in FIG. 1, including a processing assembly.

Digital cellular telephone 103 is shown schematically in FIG. 7. A speech encoder 701 receives analog speech signals from a microphone 702 and supplies similar signals to a loud speaker 703. Speech encoder 701 performs analog to digital conversion and speech encoding, resulting in a digital bit stream being supplied to a digital signal processing assembly 704. The digital signal processing assembly 704 also communicates with the lap-top computer 102 over an interface 705. The processing assembly 704 is provided with a selector, shown schematically as switch 706, allowing a first mode of operation to be selected, for normal encoded speech transmission, a second mode of operation to be selected for data transmission within speech channels and a third mode of operation to be selected for high bandwidth data transmission using wideband extensions.

The digital signal processing assembly 704 includes programmable components and is therefore configurable in response to program instructions. Its operation in said third mode is illustrated schematically in FIG. 8. Data received from computer 102 is supplied to process 801 arranged to perform forward error correction (FEC). This increases the data rate by approximately three times but adds protection against errors introduced during transmission. The FEC encoded bit stream is supplied to an interleaving process 802 which distributes the coded bits over a plurality of transmission frames so as to distribute any burst errors thereby allowing the lost data to be reconstituted during error correction at the receiver. After interleaving, data is supplied to a differential quadrature phase shift keying process 803 which in turn supplies signals to an orthogonal frequency division multiplexing process 804. The output from multiplexing process 804 is supplied to a radio interface 806 via a low pass filtering process 805.

Figure 8:
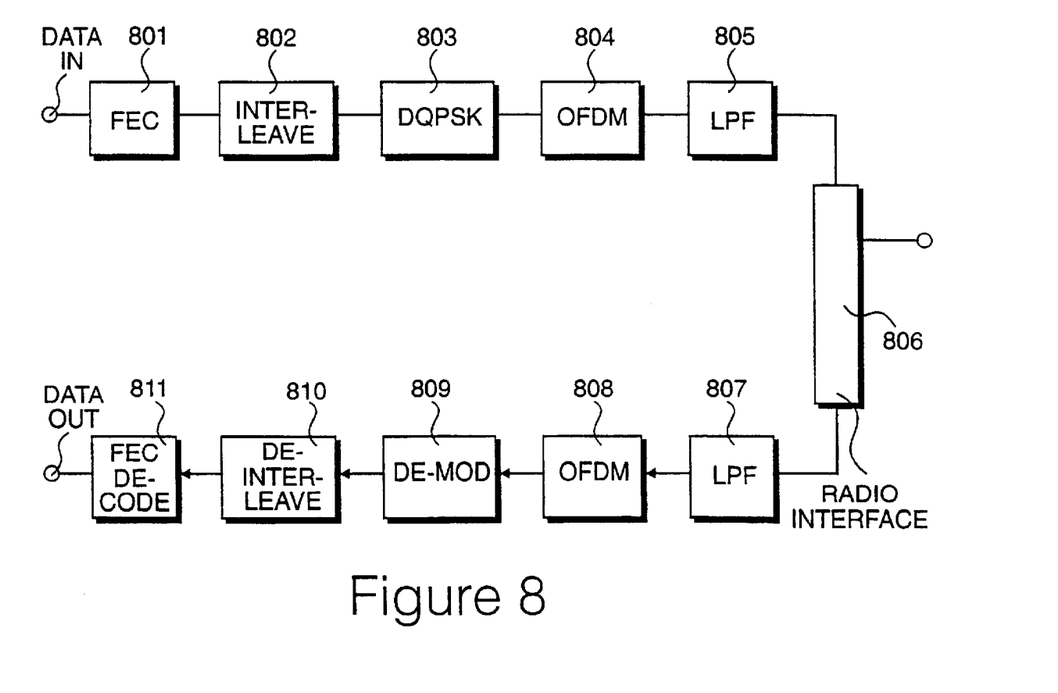
FIG. 8 details the operation of the processing assembly shown in FIG. 7, when encoding high rate data, including an orthogonal frequency division multiplexer and an orthogonal frequency division de-multiplexer.

A similar arrangement is provided on the receiving side. Signals received by radio interface 806 are supplied to a low pass filtering process 807 which in turn supplies data to an orthogonal frequency demultiplexor 808. Demodulation is then effected by process 809 which in turn supplies interleaved data to de-interleaving process 810 so that encoded data may be supplied to the an FEC de-coding process 811.

At cellular base stations, such as station 104, the process is more complicated, in that the radio interface would be arranged to communicate with a plurality of coding and decoding channels, with channels communicating on a common channel-frequency being displaced within the time division multiple access frame. Thus, wideband transmission takes place by firstly dividing the wideband spectrum into a plurality of carrier signals. These carrier signals are then further sub-divided within the time domain to provide eight time slots compatible with conventional GSM. Thereafter, data transmission takes place within each of these time slots by a process of orthogonal division multiplexing, thereby effectively transmitting the encoded digital data over a plurality of sub-carriers within the carrier bandwidth.

Orthogonal frequency division multiplexing allows data to be transmitted over a plurality of sub-carriers, where said sub-carriers are relatively close together compared to conventional frequency divisional multiplexing techniques. Sub-carriers are harmonically related and arranged such that they maintain an orthogonal phasal relationship. In this way, it is possible to demodulate the signals and retrieve the individual data streams.

A plurality of in-phase signals having a harmonic relationship is equivalent to one complex signal divided into its frequency components. The process of transforming a time related signal into representations of its frequency components is known in the art as a Fourier transform. Furthermore, it is possible to perform a fast Fourier transform (FFT) in the digital domain, allowing transformations to be made between time related signals and frequency related signals in real time.

Figure 9:
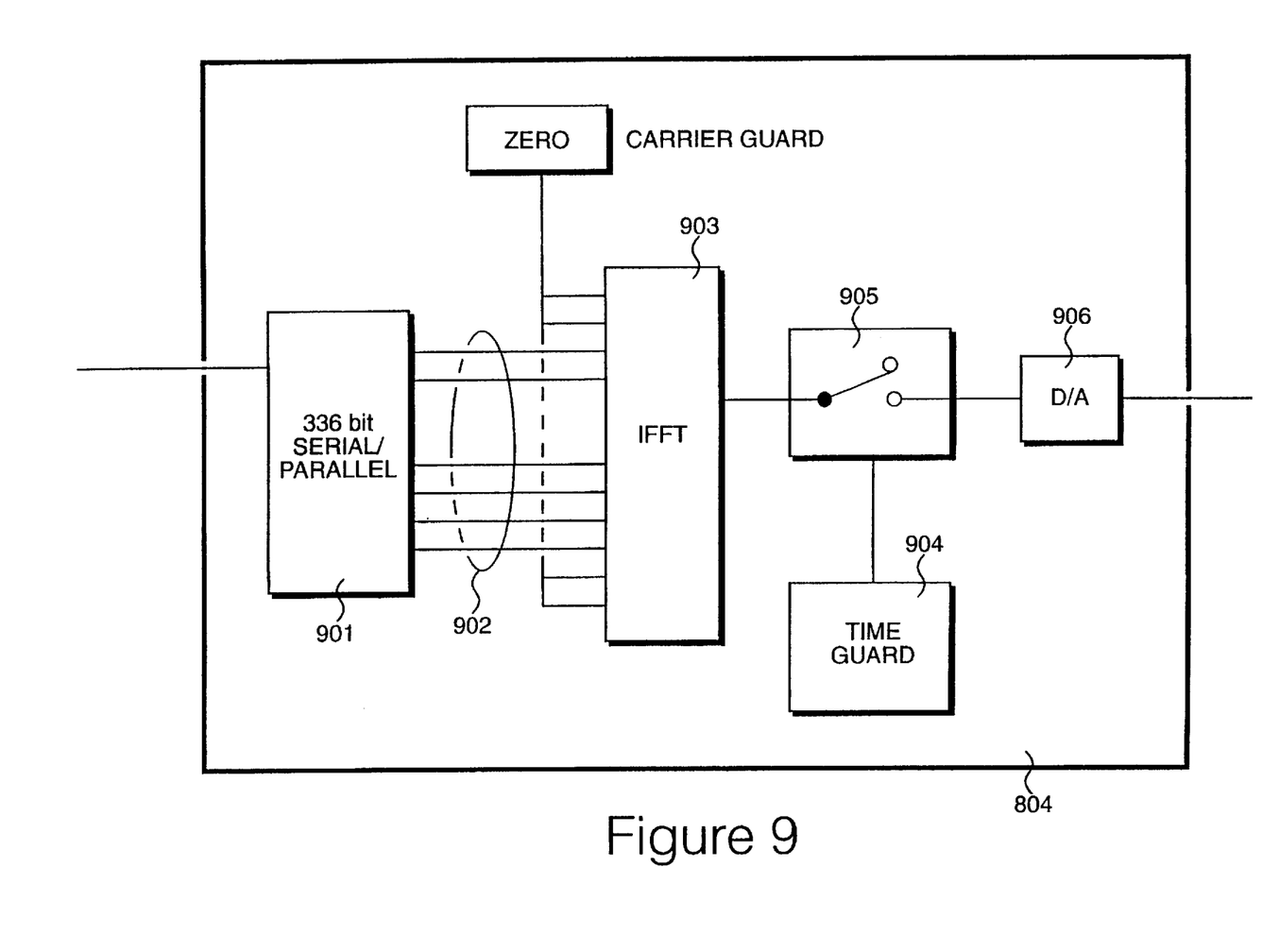
FIG. 9 details the multiplexer identified in FIG. 8.

OFDM process 804 is shown schematically in FIG. 9. The QPSK symbols produced by the modulator 803 are supplied to a serial to parallel converter 901. In this example, 168 input QPSK symbols are buffered in the serial to parallel converter to produce a 336 bit word on bus 902. This parallel word is used to modulate 168 orthogonal sub-carriers and as such may be treated as representations of harmonic amplitudes. These values are therefore supplied to an inverse fast Fourier transform process 903 arranged to take these individual representation of harmonic amplitudes and to produce a time related signal over a predetermined duration. At the receiver, this time based signal is supplied to a digital signal processor configured to perform a fast Fourier transform process from which individual amplitude levels for each harmonic are determined, thereby allowing the original input data word to be reconstituted.

In accordance with the established protocols of OFDM, the input parallel word conveyed on bus 902 is referred to as a symbol and in this example, three time based signals are transmitted during each time slot, allowing three OFDM symbols to be reconfigured within each of said time slots.

With a channel spacing of one megahertz, a sub-carrier spacing of 3.5 kilohertz is provided for the transmission of the orthogonal sub-carriers. A guard time interval of 0.005 milliseconds is provided on either side of the transmitted OFDM symbol, to give a total duration of 0.192 milliseconds. The guard time interval of 0.005 milliseconds is determined by time guard process 904 arranged to activate switching process 905. The output from switching process 905 is supplied to a digital to analog converter 906.

In order for the individual OFDM symbols to be demodulated at the receiver, it is necessary to place guards around the portion of the signal being transmitted. The IFFT system 903 is therefore arranged to receive carrier guards, each placed to a value of zero, making up a total of 256 inputs.

Figure 10:
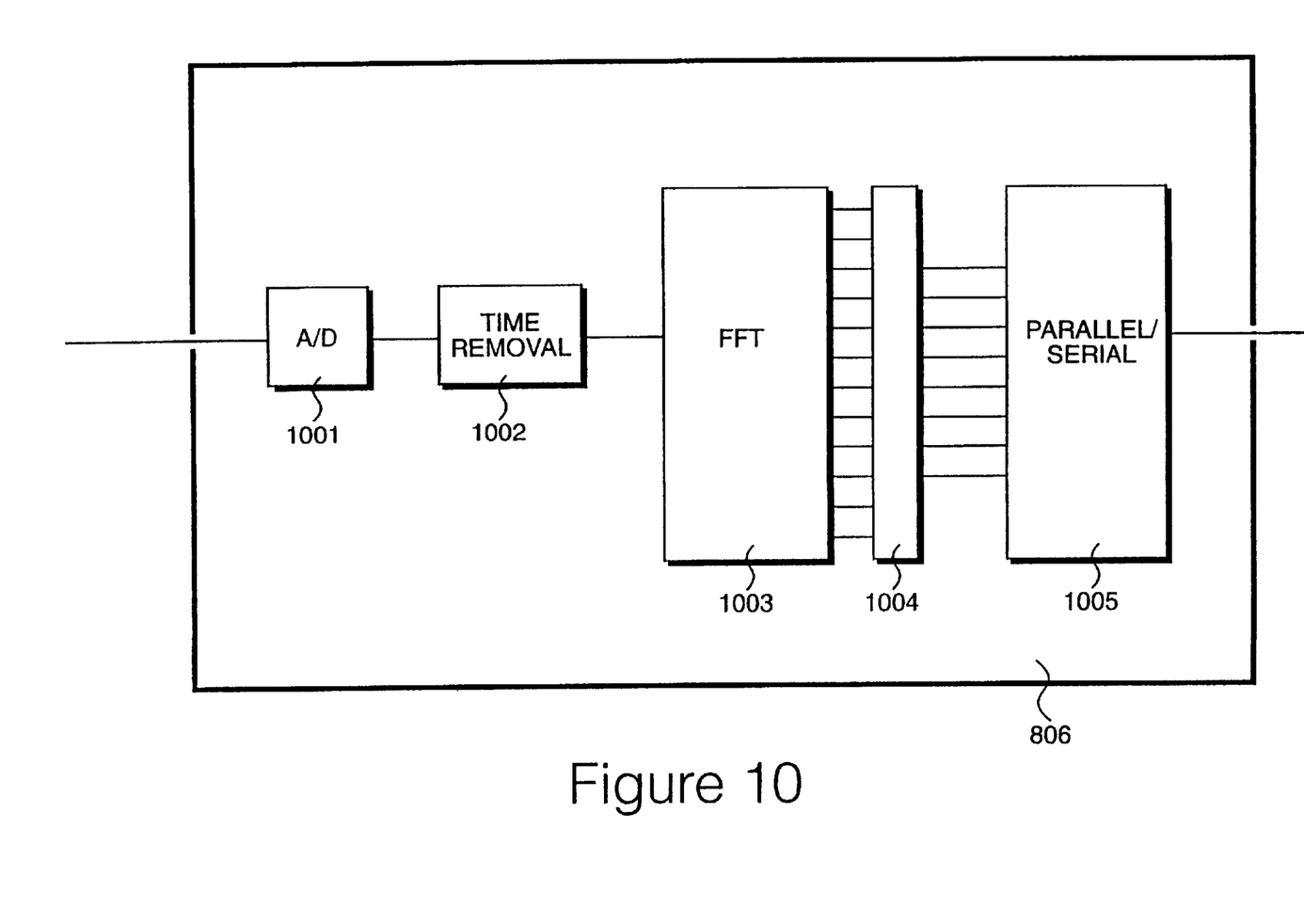
FIG. 10 details the de-multiplexer shown in FIG. 8.

OFDM de-multiplexer 806 is detailed in FIG. 10. An incoming channel is identified by radio interface 806, resulting in a multiplexed OFDM symbol being supplied to OFDM modulator 808 via a low pass filter 807. The signal received from low pass filter 807 is sampled by an analog to digital converter 1001, resulting in a stream of samples being supplied to a fast Fourier transform process 1003 via a time guard removal process 1002. The fast Fourier transform process 1002 analyses the incoming samples to produce representations of harmonics, supplied as an OFDM symbols to parallel to serial converter 1005 via a buffer 1004. Buffer 1004 is arranged to remove the front and rear guard sub-carriers, introduced by the coding process shown in FIG. 9. The parallel to serial converter 1005 receives the parallel word and converts this into HQPSK symbols for the DQPSK demodulator 807. Within each time slot, three symbols are converted by converter 1001, transformed by the FFT 1003 and converted by parallel to serial converter 1005. Thus, within each time slot, 3 OFDM symbols are received.

In the embodiment disclosed, narrowband speech data is transmitted in the primary GSM band. In an alternative embodiment a different bandwidth is used for the narrowband signal, including narrowband data, which may be around 2 GHertz or within the band designated for UMTS.

In a preferred embodiment, the TDMA frames for the narrowband speech and the data extension are synchronized although in an alternative embodiment they may not be synchronized. Such a situation may arise when the narrowband carriers are not being used.

In the preferred embodiment, different frequencies are used for bi-directional data transfer. In an alternative embodiment, a transmission by time division duplex is possible, such that uplink and downlink transmissions employ the same frequency and are only separated in the time domain.

What is claimed is:

1. Communications apparatus for mobile telephones, arranged to transmit first encoded data in accordance with a first protocol (202) and to transmit extended data in accordance with a second protocol (601), comprising first transmission means configured to transmit encoded speech data over time slots within time division multiple access frames; and second transmitting means for transmitting said extended data, wherein a second bandwidth for transmission of said extended data is divided into time slots substantially similar to said time slots for said first data which are substantially in phase with time slots for said speech data while occurring at a higher data rate than the data rate for the transmission of said speech data.

2. Apparatus according to claim 1, wherein said first transmission means is arranged to transmit said encoded speech data in accordance with GSM recommendations.

3. Apparatus according to claim 1, wherein said first transmission means and said second transmission means transmit data within frames having eight time slots.

4. Apparatus according to claim 1, wherein said second transmitting means is arranged to transmit data in accordance with a protocol that is less prone to errors than said first protocol.

5. Apparatus according to claim 1, wherein said first transmission means include signalling means arranged to communicate via signalling channels, wherein said signalling means are arranged to establish data calls for said second transmitting means.

6. Apparatus according to claim 1, wherein said second transmitting means is arranged to transmit data by a process of orthogonal frequency division multiplexing.

7. Apparatus according to claim 1, wherein said second transmitting means includes processing means arranged to perform an inverse Fourier transform process upon a plurality of data bits.

8. Apparatus according to claim 7, wherein said first processing means is arranged to transmit a plurality of OFDM symbols within a selected channel time slot.

9. Apparatus according to claim 1, wherein said second transmitting means is arranged to transmit encoded symbols at various transmission frequencies in accordance with a frequency hopping sequence.

10. Communications apparatus for mobile telephones, arranged to transmit first encoded data in accordance with a first protocol (202) and to transmit extended data in accordance with a second protocol (606), comprising
   a first transmission means for transmitting said first data over time slots within time division multiple access frames encoded in accordance with GSM recommendations; and
   second transmitting means for transmitting said extended data, wherein a second bandwidth for transmission of said extended data is divided into time slots substantially similar to said time slots for said first data, wherein,
   said first transmission means and said second transmitting means transmit data within frames having eight time slots.

11. Apparatus according to claim 10, wherein said first transmitting means is arranged to transmit encoded speech data in accordance with said GSM recommendations.

12. Apparatus according to claim 10, wherein said second transmitting means is arranged to transmit said extended data within time slot substantially in phase with said time slots for said first data.

13. Apparatus according to claim 10, wherein said second transmitting means is arranged to transmit extended data at a second data rate higher than the data rate for the transmission of said first data.

14. Apparatus according to claim 10, wherein said second transmitting means is arranged to transmit data in accordance with a protocol that is less prone to errors than said first protocol.

15. Apparatus according to claim 10, wherein said first transmission means includes signalling means arranged to communicate via signalling channels, wherein said signalling means are arranged to establish data calls for said second transmitting means.

16. Apparatus according to claim 10, wherein said second transmitting means is arranged to transmit data by a process of orthogonal frequency division multiplexing.

17. Apparatus according to claim 16, wherein said second transmitting means includes processing means arranged to perform an inverse Fourier transform process upon a plurality of data bits.

18. Apparatus according to claim 17, wherein said processing means is arranged to transmit a plurality of orthogonal frequency division multiplex symbols within a selected channel time slot.

19. Apparatus according to claim 10, wherein said second transmitting means is arranged to transmit encoded symbols at various transmission frequencies in accordance with a frequency hopping sequence.

20. Communications apparatus for mobile telephones, arranged to transmit first encoded data in accordance with a first protocol (202) and to transmit extended data in accordance with a second protocol (606), comprising
   first transmission means for transmitting said first data over time slots within time division multiple access frames; and
   second transmitting means for transmitting said extended data, wherein a second bandwidth for transmission of said extended data is divided into time slots substantially similar to said time slots for said first data, wherein
   said first transmission means includes signalling means arranged to communicate via signalling channels, and
   said signalling means are arranged to establish data calls for said second transmitting means.

21. Apparatus according to claim 20, wherein said first transmitting means for transmitting first data is arranged to transmit encoded speech data.

22. Apparatus according to claim 21, wherein said first transmission means is arranged to transmit said data encoded in accordance with GSM recommendations.

23. Apparatus according to claim 20, wherein said second transmitting means is arranged to transmit said extended data within time slots substantially in phase with said time slots for said first data.

24. Apparatus according to claim 21, wherein said first transmission means and said second transmitting means transmit data within frames have eight time slots.

25. Apparatus according to claim 20, wherein said second transmitting means is arranged to transmit extended data at a second data rate, higher than the data rate for the transmission of said first data.

26. Apparatus according to claim 20, wherein said second transmitting means is arranged to transmit data in accordance with a protocol that is less prone to errors than said first protocol.

27. Apparatus according to claim 20, wherein said second transmitting means is arranged to transmit data by a process of orthogonal frequency division multiplexing.

28. Apparatus according to claim 27, wherein said second transmitting means includes processing means arranged to perform an inverse Fourier transform process upon a plurality of data bits.

29. Apparatus according to claim 28, wherein said processing means is arranged to transmit a plurality of orthogonal frequency division multiplex symbols within a selected channel time slot.

30. Apparatus according to claim 20, wherein said second transmitting means is arranged to transmit encoded symbols at various transmission frequencies in accordance with a frequency hopping sequence.

31. A method of mobile telephony, wherein first encoded data is transmitted in accordance with a first protocol and extended data is transmitted in accordance with a second protocol, comprising the steps of
   transmitting encoded speech data over time slots within time division multiple access frames; and
   transmitting said extended data, wherein a second bandwidth for transmission of said extended data is divided into time slots substantially similar to said time slots for said first data which are substantially in phase with time slots for said speech data while occurring at a higher data rate than the data rate for the transmission of said speech data.

32. A method according to claim 31, wherein said encoded speech data is transmitted in accordance with GSM recommendations.

33. A method according to claim 31, wherein said second transmission occurs within data frames having eight time slots.

34. A method according to claim 31, wherein said second transmission is arranged to transmit data in accordance with the protocol that is less prone to errors than said first protocol.

35. A method of mobile telephony, wherein first encoded data is transmitted in accordance with a first protocol and extended data is transmitted in accordance with a second protocol, comprising the steps of
   transmitting first data over time slots within time division multiple access frames encoded in accordance with GSM recommendations; and
   transmitting said extended data via a second bandwidth divided into time slots substantially similar to time slots for said first data, wherein
   said first transmission and said second transmission occur within frames having eight time slots.

36. A method according to claim 35, wherein said first transmission process includes signalling procedures, wherein said signalling procedures are arranged to communicate via signalling channels so as to establish data calls for said second transmitting procedures.

37. A method of mobile telephone, wherein first encoded data is transmitted in accordance with a first protocol and extended data is transmitted in accordance with a second protocol, comprising steps of transmitting said first data over time slots within time division multiple access frames and transmitting said extended data within a second bandwidth for transmission of said extended data divided into time slots substantially similar to the time slots for the transmission of said first data, wherein said first transmission procedure includes signalling means arranged to communicate via said signalling channels, and said signalling procedures arranged to establish data calls for said second transmission procedures.

* * * * *